United States Patent [19]

Mason et al.

[11] 3,713,228

[45] Jan. 30, 1973

[54] LEARNING AID FOR THE HANDICAPPED

[76] Inventors: Henry J. Mason; Geoffrey A. Jones, both of 1432 East 65th Street, Brooklyn, N.Y. 11234

[22] Filed: May 24, 1971

[21] Appl. No.: 146,345

[52] U.S. Cl. ................................................... 35/35 A
[51] Int. Cl. ................................................ G09b 21/00
[58] Field of Search ............. 35/35 A, 35 C; 340/407

[56]     References Cited

UNITED STATES PATENTS 1,733,605  10/1929  Jones ..................................... 35/35 A
2,866,279  12/1928  Surber .................................... 35/35 A
3,229,387  1/1966   Linvill .................................... 35/35 A
2,012,924  8/1935   Conklin ................................... 35/35 A

*Primary Examiner*—Wm. H. Grieb
*Attorney*—Allison C. Collard

[57]     ABSTRACT

A tactile learning aid, for handicapped persons, especially children, having a severe hearing loss, in which vibrating pins contact the fingers of the handicapped person and indicate the correct pronunciation of a particular alphabetic letter.

7 Claims, 5 Drawing Figures

PATENTED JAN 30 1973 3,713,228
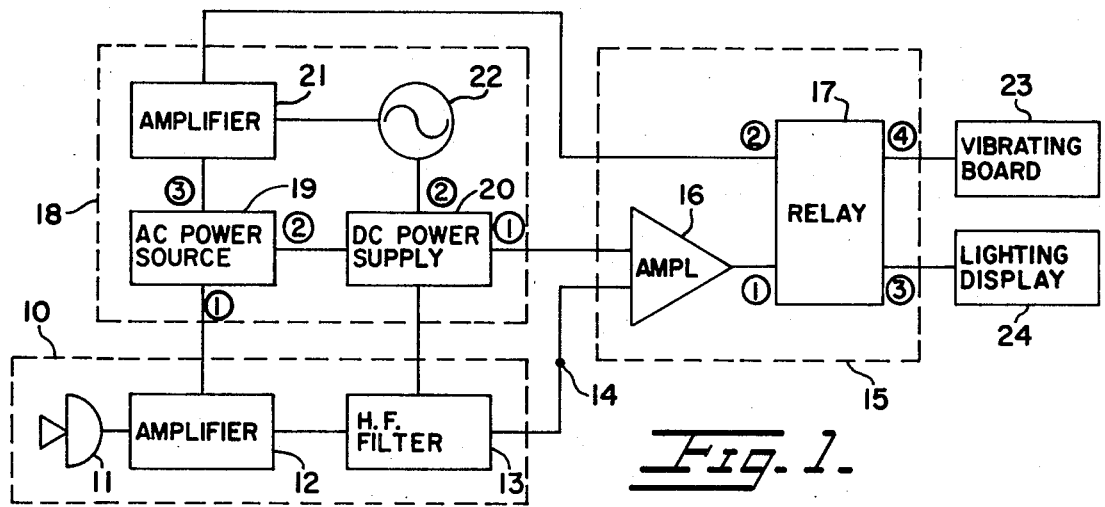
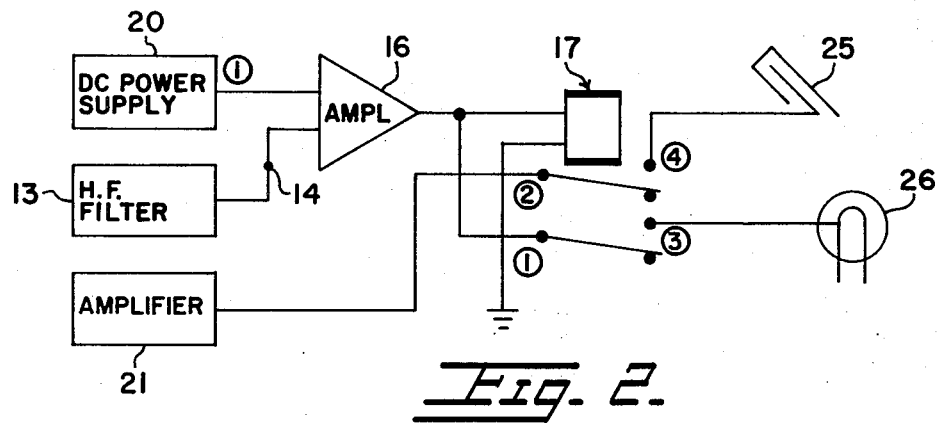
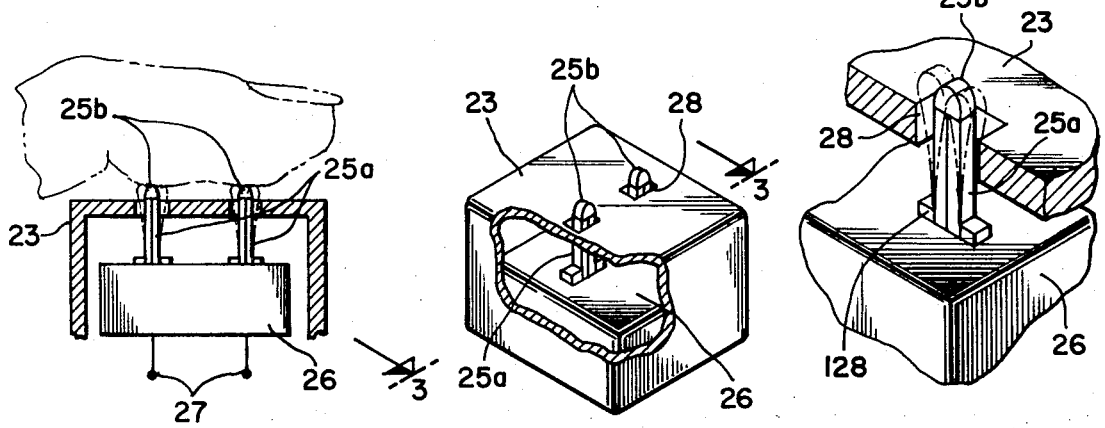
INVENTORS.
HENRY J. MASON
GEOFFREY A. JONES

LEARNING AID FOR THE HANDICAPPED

This invention relates to learning aids for the handicapped, and in particular, to learning aids for handicapped persons, especially children, who have a severe high frequency hearing loss.

Handicapped persons who suffer from high frequency hearing losses have much difficulty in learning to speak correctly since they cannot hear themselves speak. The person, therefore, does not know if he is pronouncing a particular letter or word in an intelligible manner. Previous speech therapy devices designed to indicate to the handicapped person that his pronounciation is correct, utilize large displays of flashing lights which are illuminated in response to a correct pronounciation of one of a number of letters the machine is programmed to process. These devices, however, tend to confuse the handicapped person, and have been especially unsuccessful in treating handicapped children. Children tend to be distracted and confused by the flashing lights, and this type of device gives them little encouragement or reward for correctly pronouncing the letter.

Accordingly, the present invention overcomes the above mentioned disadvantages by providing a learning aid in which a plurality of vibrating pins contact a finger of the handicapped person and vibrate in response to a correct pronounciation. The device is especially useful for teaching children, since they are amused by the physical sensation caused by the vibrating pins and are encouraged to speak correctly. They are, in a sense, reswarded for correct pronounciation. The device is thus a more effective aid for speech therapists, since it encourages children to learn faster.

It is therefore an object of the present invention to provide a learning aid for the handicapped, especially those with severe high frequency hearing loss, which indicates a correct pronounciation of an alphabetic letter by means of vibrating pins which contact the fingers of the person.

It is also an object of the present invention to provide a learning device for handicapped persons, especially children, which will reward the handicapped person and encourage him to learn to speak correctly.

It is a further object of the present invention to provide a learning aid which is simple in design, easy to manufacture and efficient and reliable in operation.

Other objects and features of the present invention will become apparent from the following detailed description considered in connection with the accompanying drawings which disclose one embodiment of the invention. It is to be understood, however, that the drawings are designed for the purpose of illustration only and not as a definition of the limits of the invention.

In the drawings, wherein similar reference characters denote similar elements throughout the several views:

FIG. 1 is a block diagram of a learning aid constructed in accordance with the present invention;

FIG. 2 is a schematic diagram showing the connection of the signal processing means and power supply means to the vibrating pins and the lighting display of the present invention;

FIG. 3 is a cross-sectional side view of a vibrating board constructed in accordance with the invention showing the pins contacting a finger of the handicapped person;

FIG. 4 is a perspective view, partially broken away, of the vibrating board shown in FIG. 3; and FIG. 5 is an enlarged perspective side view showing a single vibrating pin and bimorph of a vibrating board constructed in accordance with the present invention.

Referring to FIG. 1, there is shown signal processing means 10 consisting of microphone 11, amplifier 12 and high frequency filter 13. When the handicapped person speaks into microphone 11, the audible speech signals will be converted into electrical analog signals and transmitted to a first stage of amplifier 12. This first stage controls the power supply to a second stage of amplifier 12 and ensures that the amplifier will be actuated only when there is a speech signal transmitted by microphone 11. At all other times, the second stage will be switched off. The electrical analog signals will be amplified by amplifier 12 and transmitted to high frequency filter 13 which filters out all signals except those lying within a selected frequency range. If, for example, the letter to be pronounced correctly is "S," the filter will block all signals except those lying within the frequency range of 8–8.5 khz, the sound spectrum for a correct pronounciation of this letter.

If the letter is pronounced correctly, signal processing means 10 will produce an output signal at 14 which is then coupled to control means 15. This part of the device consists of amplifier 16 which amplifies the signal passed by processing means 10 and applies it to relay 17.

Power for the signal processing means and the control means is supplied by power supply means 18 consisting of AC power source 19, coupled to amplifier 12, and DC power supply 20, coupled to amplifier 16. The AC power source is coupled to DC power supply 20 and amplifier 21, and oscillator 22 is coupled to amplifier 21 and DC power supply 20.

The voltage output from amplifier 21 is coupled to relay 17 and is applied to the vibrating pins on vibrating board 23 whenever there is an output signal at 14. A lighting display 24 may also be included in the device in order to indicate to the speech therapist that the vibrating pins are working. This device is optional, and is not primarily intended to be used as an indicator for the handicapped person. Of course, if the speech therapist desires, it may be used in conjunction with the vibrating pins to give added emphasis to a correct pronounciation by the person using the learning device.

During operation of the device, AC power source 19 supplies 117 volts AC to amplifier 12, DC power supply 20 and amplifier 21 through terminals 1, 2 and 3 respectively. DC power supply 20 has voltage outputs of 12 volts DC coupled to amplifier 16 and oscillator 22 through terminals 1 and 2 respectively. The oscillator provides a 200 hz signal input to amplifier 21 which has a 25 volt AC output and is coupled to the vibrating pins on vibrating board 23 through relay 17. A switch may also be connected to AC power source 19 in order to turn the device on and off.

The high frequency filter is designed so that it will block out those frequencies outside the sound spectrum of the particular letter that is to be pronounced. FIG. 1 illustrates an embodiment of the invention in which only one letter is to be pronounced. However, it is obvious that additional circuits may be added so that the machine will indicate a response for a plurality of different letters.

Vibrating board 23 indicates that the letter has been correctly pronounced by the handicapped person, and consists of a pair of vibrating pins arranged in a vertical column over which the handicapped person or child places one of his fingers. The number of pins used is completely arbitrary, and any number of pins may be used. The pins of each board consist of a piezoelectric bimorph having a pin approximately 1/32 of an inch in diameter affixed to the top surface thereof. The bimorphs just described are well known in the art and may be of any suitable type, such as those manufactured by the Clevite Corporation of Bedford, Ohio.

The reading aid may also be provided with fuses connected in series between vibrating board 23 and relay 17 in order to prevent damage to the amplifier from short circuits. Fuses may also be connected in series between relay 17 and the lighting display 24, if such a display is included in the device.

When the person speaks into microphone 11, if his pronounciation is correct, the vocal signal will be transmitted through amplifier 12, filter 13 and amplifier 16 to relay 17. The output of amplifier 21 will then be applied to vibrating board 23 and the pins will vibrate. If, however, the person does not pronounce the letter correctly, the high frequency filter 13 will block the electrical signal and prevent relay 17 from applying voltage to vibrating board 23. The pins thus will not vibrate.

FIG. 2 schematically illustrates the connection of amplifiers 16 and 21 through relay 17 to vibrating pin 25 of vibrating board 23 and lamp 26 of lighting display 24. Amplifier 16 is powered by DC supply 20 as previously stated, and when a signal appears at 14 from high frequency filter 13, a signal of approximately 6 volts DC is applied to amplifier 16. The output signal from the amplifier is approximately 12 volts DC and is applied to the coil of relay 17, and also to terminal 1 of relay 17 in order to activate lamps 26 through terminal 3. As a result, the 25 volt AC output of amplifier 16 is coupled through terminal 1 of relay 17 to terminal 4 to vibrating pin 25. Thus, when the relay is activated, lamps 26 will light and vibrating pins 25 will vibrate.

FIGS. 3, 4 and 5 are detailed illustrations of the bimorph vibrating board 23. Vibrating pins 25 consist of bimorph 25a and pin 25b affixed to the top surface of the bimorph. The pins are mounted on a stationary mounting surface 26 and coupled to relay 17 through terminals 27. The bimorph board may consist of any type of rigid material, and has apertures 28 disposed in the top surface of the board through which pins 25b protrude. In FIG. 3, one finger 19 is shown disposed on the top of vibrating board 23 over pins 25b in a position to sense the vibrations of the pins when a correct pronounciation is made. The embodiment of the present invention has a vertical column of two pins protruding through the top surface of the vibrating board. Two pins were chosen simply because they provide a greater sensation than one pin. As previously stated, the number of pins used is merely a matter of choice.

FIG. 5 is an enlarged view of vibrating pin 25 showing pin 25b and bimorph 25a rigidly affixed to stationary mounting means 26 by means of mounting members 128 disposed adjacent to the bimorph. Pins 25b project from apertures 28 to contact the fingers of the handicapped person using the machine. Mounting members 128 may be of any suitable rigid material affixed to mounting surface 26. The bimorphs are of the cantilever type, and vibrate back and forth in the apertures as indicated by the arrows.

It should be noted that any number of vibrating boards may be used for contacting a plurality of fingers or both hands of the person. The vibrations may also be placed on other parts of the body, such as the arm or leg. The illustrated embodiment is not intended to limit the concept of the invention.

In using the device, the handicapped person places one finger over the pair of vibrating pins on the vibrating board as illustrated in FIG. 3 and speaks into microphone 11. If his pronounciation is correct, the analog electrical signal created by his voice is transmitted through the signal processing means and control means as previously described, and causes the voltage output of the amplifier 21 to be applied to vibrating pins 25. The handicapped person will then sense the vibrations of the pins and know that the pronounciation is correct. A visual indication that the handicapped person has been successful is also given to the speech therapist by means of lighting display 24. If there is an incorrect pronounciation, no signal will be transmitted and the vibrating pins will not vibrate, thereby indicating to the user that his pronounciation is incorrect.

In a device actually constructed and tested, the vibrating pins operated at 10–30 volts and 12–500 hz. The resonant frequency was about 150–200 hz. Relay 17 was a d.p.s.t. action switch, having a coil voltage of 30 volts DC, coil resistance of 4,000 ohms, and a current rating of 40 milliwatts. AC power source 19 supplied 117 volts at 60 cycles to amplifier 12, DC power supply 20 and amplifier 21. DC power supply 20 supplied 12 volts DC to amplifier 16 and oscillator 22, which had an output signal of 200 hz. Amplifier 21 had an input impedance of 10,000 ohms, an output impedance of 8 ohms, and a frequency response of 50–15,000 hz, and supplied 25 volts AC to relay 17.

The structural and technical operation of bimorphs 25a used to vibrate pins 25b are well known in the art. However, a detailed description of the operation of the bimorphs is contained in Technical Paper TP–237, published by the Clevite Corporation of Bedford, Ohio.

While only a specific embodiment of the present invention has been shown and described, it will be obvious that many changes and modifications may be made thereunto without departing from the spirit and scope of the invention.

What is claimed is:

1. A learning aid for the handicapped, comprising:
    a microphone, for detecting audible speech signals and converting said signals to electrical analog signals representative of said audible signals;
    first means, coupled to said microphone, for amplifying said electrical analog signals;
    filtering means, coupled to said amplifying means, for blocking the transmission of amplified electrical analog signals representative of audible speech signals which lie outside the limits of a predetermined frequency range from said amplifying means;
    at least one vibrating pin, responsive to selected audible speech signals, for indicating the presence of audible speech sounds lying within said predetermined frequency range;

power supply means, including an amplifier, an AC power source, a DC power supply, and an oscillator, for supplying electrical power;

second means, coupled to said filtering means and said power supply means, for amplifying said electrical analog signals amplified by said first amplifying means and transmitted by said filtering means; and a relay, coupled to said second amplifying means, said vibrating pin and said power supply means, for coupling a selected electrical voltage supplied by said power supply means to said vibrating pin in response to said amplified electrical analog signals transmitted by said second amplifying means, so as to cause said vibrating pin to vibrate and thereby indicate the detection of an audible speech signal lying within said predetermined frequency range.

2. The learning aid for the handicapped as recited in claim 1, further comprising a rigid board having a pair of said vibrating pins disposed therein and arranged adjacent to each other, said board having a pair of apertures through which the end of said pins project.

3. The learning aid for the handicapped as recited in claim 2, wherein said pair of pins and said apertures are arranged in a vertical column.

4. The learning aid for the handicapped as recited in claim 2, wherein said vibrating pins comprise a bimorph and a rigid pin affixed to the top surface of said bimorph.

5. The learning aid for the handicapped as recited in claim 2 further comprising a plurality of lamps coupled to said relay for indicating when said vibrating pins are vibrating.

6. The learning aid for the handicapped as recited in claim 2, wherein said signal processing amplifier is a two-stage amplifier, the second stage of which is actuated only when an audible signal is detected by said microphone and transmitted to the first stage of said amplifier.

7. The learning aid for the handicapped as recited in claim 2, wherein said predetermined frequency range is 8–8.5 khz corresponding to the sound frequency range of the correct pronounciation of the letter S.

* * * * *